(12) United States Patent
Shoji

(10) Patent No.: US 7,414,397 B2
(45) Date of Patent: Aug. 19, 2008

(54) ANGLE SWITCH DEVICE WITH MAGNETORESISTIVE EFFECT ELEMENT

(75) Inventor: Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 8 days.

(21) Appl. No.: 11/399,435

(22) Filed: Apr. 7, 2006

(65) Prior Publication Data

US 2006/0255796 A1    Nov. 16, 2006

(30) Foreign Application Priority Data

May 16, 2005   (JP)   ............................. 2005-142631

(51) Int. Cl.
  *G01B 7/30*   (2006.01)
  *G01R 33/09*  (2006.01)
(52) U.S. Cl. ................. 324/252; 324/207.21; 338/32 R
(58) Field of Classification Search ................. 324/252, 324/207.21, 207.25, 244, 249; 338/32 R; 335/215; 365/158, 173; 360/324, 324.1, 360/324.2
See application file for complete search history.

(56) References Cited

U.S. PATENT DOCUMENTS

| 5,300,883 | A    |   | 4/1994 | Richeson |
| 6,734,667 | B2   | * | 5/2004 | Lorenzen ................. 324/207.2 |
| 7,190,159 | B2   | * | 3/2007 | Galbreath et al. ........ 324/207.2 |

FOREIGN PATENT DOCUMENTS

| JP | 8-5312   | 1/1996 |
| JP | 10-62112 | 3/1998 |

* cited by examiner

*Primary Examiner*—Reena Aurora
(74) *Attorney, Agent, or Firm*—Oblon, Spivak, McClelland, Maier & Neustadt, P.C.

(57) ABSTRACT

An angle switch device includes at least one MR element with a pinned layer and a free layer, and a magnet section. A relative angle between the magnet section and a lamination plane of the at least one MR element in a plane that contains a fixed magnetization direction of the at least one MR element and is perpendicular to the lamination plane of the at least one MR element is variable. The angle switch device provides a signal that represents whether the relative angle between the magnet section and the lamination plane of the at least one MR element is larger than or smaller than 90 degrees.

8 Claims, 3 Drawing Sheets

ANGLE SWITCH DEVICE WITH MAGNETORESISTIVE EFFECT ELEMENT

PRIORITY CLAIM

This application claims priority from Japanese patent application No. 2005-142631, filed on May 16, 2005, which is incorporated herein by reference.

BACKGROUND OF THE INVENTION

1. Field of the Invention

The present invention relates to an angle switch device using a magnetoresistive effect (MR) element.

2. Description of the Related Art

U.S. Pat. No. 5,300,883, Japanese patent publication No. 08-005312A or Japanese patent publication No. 10-062112A discloses a sensor responding to a magnetic field applied from a magnet or a magnetic medium for example, for detecting a rotational angle. In each document, disclosed is an angle sensor with a Hall element that linearly detects a rotation-dependent magnetic flux density of the magnetic field applied thereto to provide an output representing the detected magnetic flux density.

In general, the magnetic flux density of the magnetic field from the magnet decreases proportional to a square of the distance from the magnet. Therefore, in order to linearly detect the magnetic flux density by using the Hall element, it is necessary to apply a magnetic field with a large magnetic flux density to the sensor element. Particularly, because the Hall element has a large temperature coefficient of about 10,000 ppm, required is a larger magnetic flux density to perform the rotational angle detection with stability. Therefore, the Hall element has to be used in conjugation with a magnet having a sufficiently large magnetic flux density or a magnet having a big volume.

Also, because the Hall element has the large temperature coefficient, when used to perform switching operation by comparing its output with a threshold so as to obtain a binary signal, it is quite difficult to expect precise switching operation even if the magnet is closely arranged with the Hall element.

SUMMARY OF THE INVENTION

It is therefore an object of the present invention to provide an angle switch device, whereby precise and sensitive on/off switching operation responding to the angle, that is angle-switching operation, can be expected even when a small size magnet with a low residual magnetic flux density is used.

Another object of the present invention is to provide an angle switch device, whereby stable angle-switching operation can be expected under temperature varying conditions.

According to the present invention, an angle switch device includes at least one MR element with a pinned layer and a free layer, and a magnet section. A relative angle between the magnet section and a lamination plane of the at least one MR element in a plane that contains a fixed magnetization direction of the at least one MR element and that is perpendicular to the lamination plane of the at least one MR element is variable. The angle switch device provides a signal that represents whether the relative angle between the magnet section and the lamination plane of the at least one MR element is larger than or smaller than 90 degrees.

No linear detection of magnetic flux is executed but switching operations is executed using the multilayered MR element with the pinned layer and the free layer to provide a signal depending upon that a direction of the magnetic field applied to the MR element from the magnet section is inclined to which side with respect to the fixed magnetization direction of the MR element. Because used are the multilayered MR element capable of providing an output that steeply changes around a threshold angle and also an output around the threshold angle is utilized for the switching operations, highly sensitive and precise detection can be performed even if the applied magnetic field is extremely weak. Therefore, it is possible to use a small size magnet with a low residual magnetic flux density and thus the whole size of the sensor can be greatly decreased. Furthermore, because the multilayered MR element is used instead of the Hall element, stable detection can be expected even when the environment temperature changes.

It is preferred that the device further includes a circuit connected to an output terminal of the at least one MR element, for comparing an output from the at least one MR element with a predetermined threshold to provide a binary signal that represents whether the relative angle between the magnet section and the lamination plane of the at least one MR element is larger than or smaller than 90 degrees.

It is also preferred that the circuit includes a comparator circuit or a differential amplifier circuit for comparing the output from the at least one MR element with the predetermined threshold, and an output circuit for providing the binary signal depending upon an output from the comparator circuit or the differential amplifier circuit.

It is preferred that the at least one MR element consists of a single MR element.

It is also preferred that the at least one MR element consists of two MR elements arranged in parallel with each other and that fixed magnetization directions of the two MR elements are opposite to each other.

It is further preferred that output terminals of the two MR elements are connected in series with each other and an output is derived from a middle point of the series connection. Because used are the two MR elements and half bridge connection, it is possible to provide more stable angle detection under variations in the environment temperature.

It is still further preferred that the at least one MR element is arranged at a fixed position and the magnet section is arranged at a rotatable position capable of rotating around the fixed position.

It is preferred that the at least one MR element includes at least one giant magnetoresistive effect (GMR) element or at least one tunnel magnetoresistive effect (TMR) element.

Further objects and advantages of the present invention will be apparent from the following description of the preferred embodiments of the invention as illustrated in the accompanying drawings.

DESCRIPTION OF THE PREFERRED EMBODIMENTS

Figure 1:
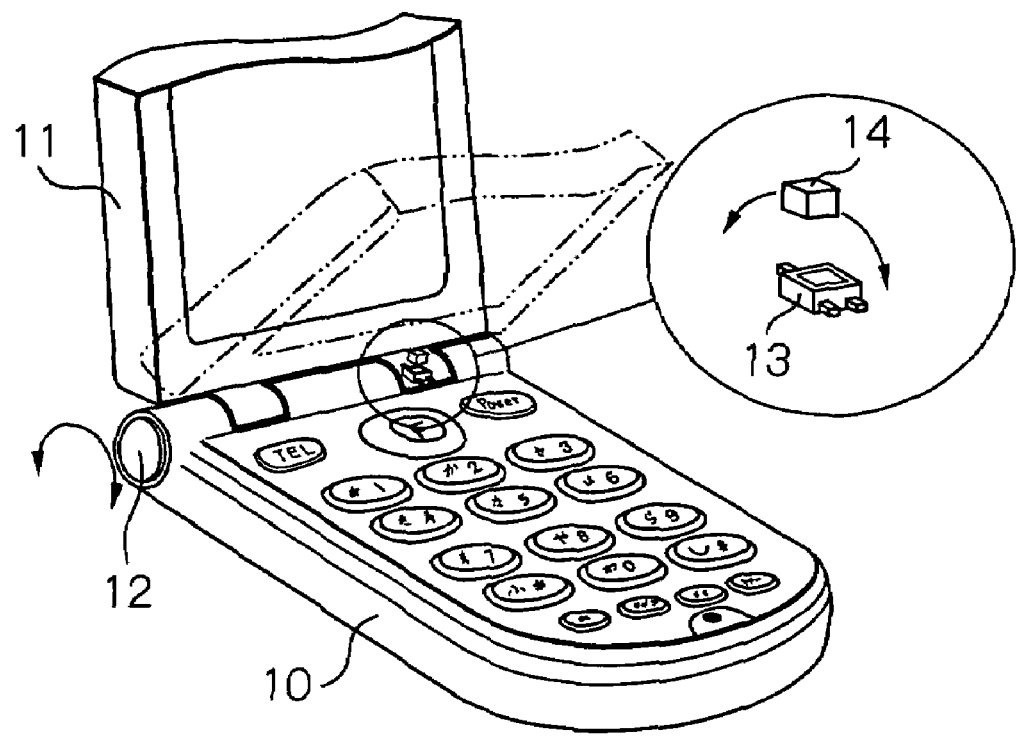
FIG. 1 shows an oblique view schematically illustrating a configuration of a mobile phone with an angle switch device as a preferred embodiment according to the present invention.
Figure 2:
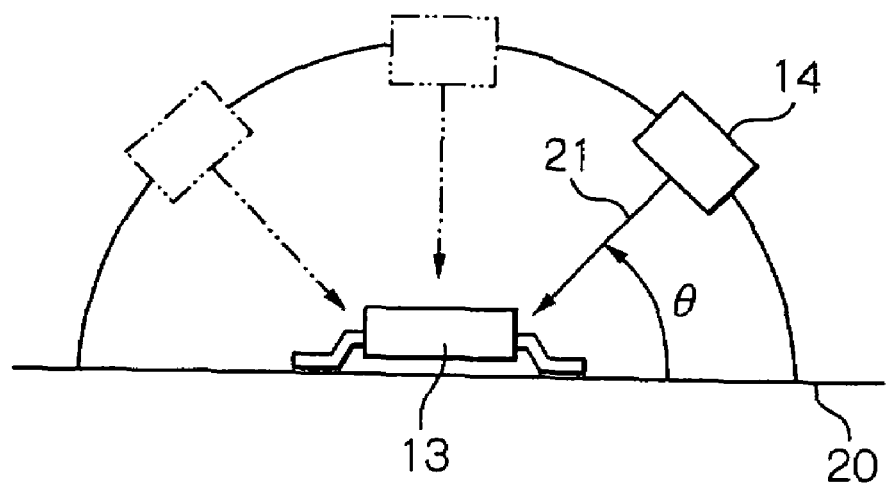
FIG. 2 shows a view illustrating a configuration of a magnetic sensor element and a magnet section of the angle switch device in the embodiment of FIG. 1.
Figure 3A:
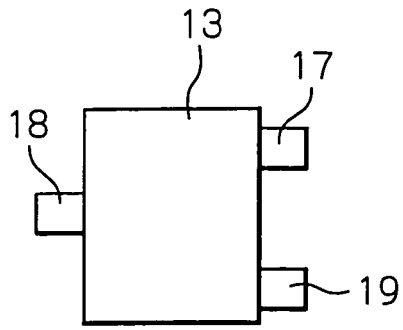
FIGS. 3a and 3b show a plane view and a perspective plane view illustrating configurations of the magnetic sensor element and the magnet section of the angle switch device in the embodiment of FIG. 1.
Figure 3B:
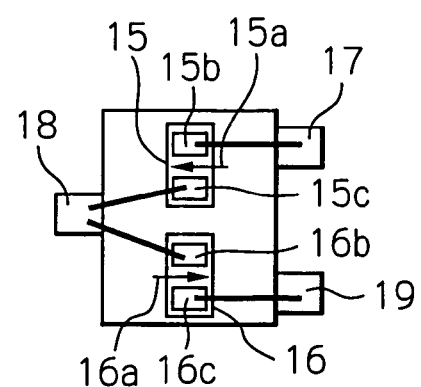

FIG. 1 schematically illustrates a configuration of a mobile phone with an angle switch device as a preferred embodiment according to the present invention, FIG. 2 illustrates a configuration of a magnetic sensor element and a magnet section of the angle switch device in the embodiment of FIG. 1, and FIGS. 3a and 3b illustrate an external configuration and an internal configuration of the magnetic sensor element and the magnet section of the angle switch device in the embodiment of FIG. 1. In this embodiment, the angle switch device according to the present invention is used for detecting whether a collapsible mobile phone is in a folded state or unfolded state.

In FIG. 1, reference numeral 10 denotes a main body case with an operation section of the mobile phone, 11 denotes a cover case with a display section of the mobile phone, and 12 denotes a hinge section for foldably coupling the main body case 10 and the cover case 11, respectively.

The hinge section 12 is provided with the magnetic detection element 13 and the magnet section 14 of the angle switch device. The magnetic detection element 13 is attached to the hinge section 12 at the center of rotation at rest, and the magnet section 14 is attached to the hinge section 12 so as to rotate about the magnetic detection element 13 as shown in FIGS. 1 and 2 in response to the rotation of the cover case 11. In modifications, the magnet section 14 may be attached to the hinge section 12 at rest and the magnetic detection element 13 may be attached to the hinge section 12 to rotate about the magnet section 14.

The magnetic detection element 13 consists of in this embodiment two GMR elements 15 and 16 molded in a single chip as shown in FIGS. 3a and 3b. Each of the GMR elements 15 and 16 has a multilayered structure with a pin layer of an antiferromagnetic material layer, a pinned layer of a ferromagnetic material layer, a space layer of a nonmagnetic conductive material layer and a free layer of a ferromagnetic material layer. These two GMR elements 15 and 16 are arranged in parallel with each other and fixed magnetization directions 15a and 16a thereof are opposite to each other. One electrode 15b of the GMR element 15 is electrically connected to a terminal 17, the other electrode 15c of the GMR element 15 and one electrode 16b of the GMR element 16 are electrically connected to a terminal 18, and the other electrode 16c of the GMR element 16 is electrically connected to a terminal 19. Instead of the GMR element, a TMR element may be used in modifications.

Figure 4:
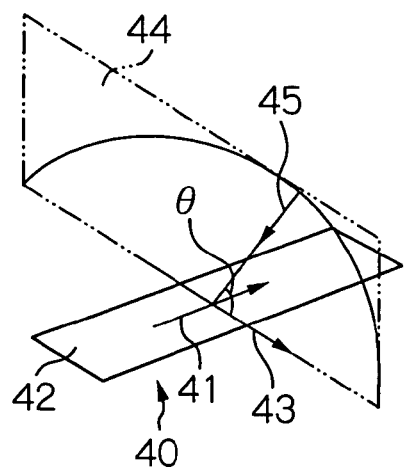
FIG. 4 shows a view illustrating angle-detection operations of a GMR element.
Figure 5:
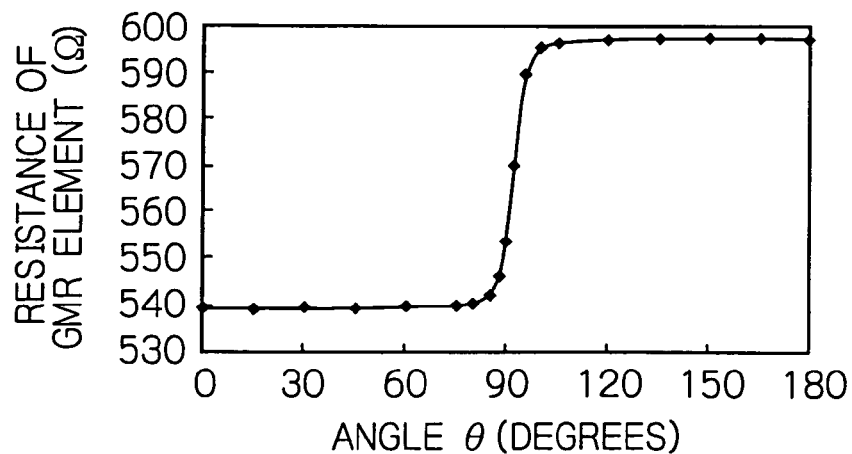
FIG. 5 shows a graph illustrating characteristics of a resistance of the GMR element with respect to an angle of the magnetic field applied.

Suppose a sense current flows along a direction 41 of the length of the GMR element 40 and the fixed magnetization direction is a direction 43 that is perpendicular to the sense current direction 41 and in parallel to a lamination plane 42 of the GMR element 40 as shown in FIG. 4. In this case, when an angle $\theta$, in a plane 44 that is in parallel with the fixed magnetization direction 43 and perpendicular to the lamination plane 42, between the magnetic field 45 externally applied and the lamination plane 42 approaches 90 degrees, the resistance of the GMR element 40 abruptly changes as shown in FIG. 5. Accordingly, the output voltage of the GMR element steeply changes and therefore it is possible to achieve angle-switching operations depending upon whether the angle $\theta$ is larger than or smaller than 90 degrees. In other words, when the cover case 11 rotates about the hinge section 12 due to the folding and unfolding operations of the mobile phone, the magnet section 14 rotates around the magnetic detection element 13 as illustrated in FIG. 2. Thus, it is possible to detect whether the angle $\theta$ of the magnetic field 21 applied from the magnet section 14 with respect to the plane 20 that is in parallel with the lamination plane 40 (FIG. 4) of the GMR elements 15 and 16 is larger than or smaller than 90 degrees.

Figure 6:
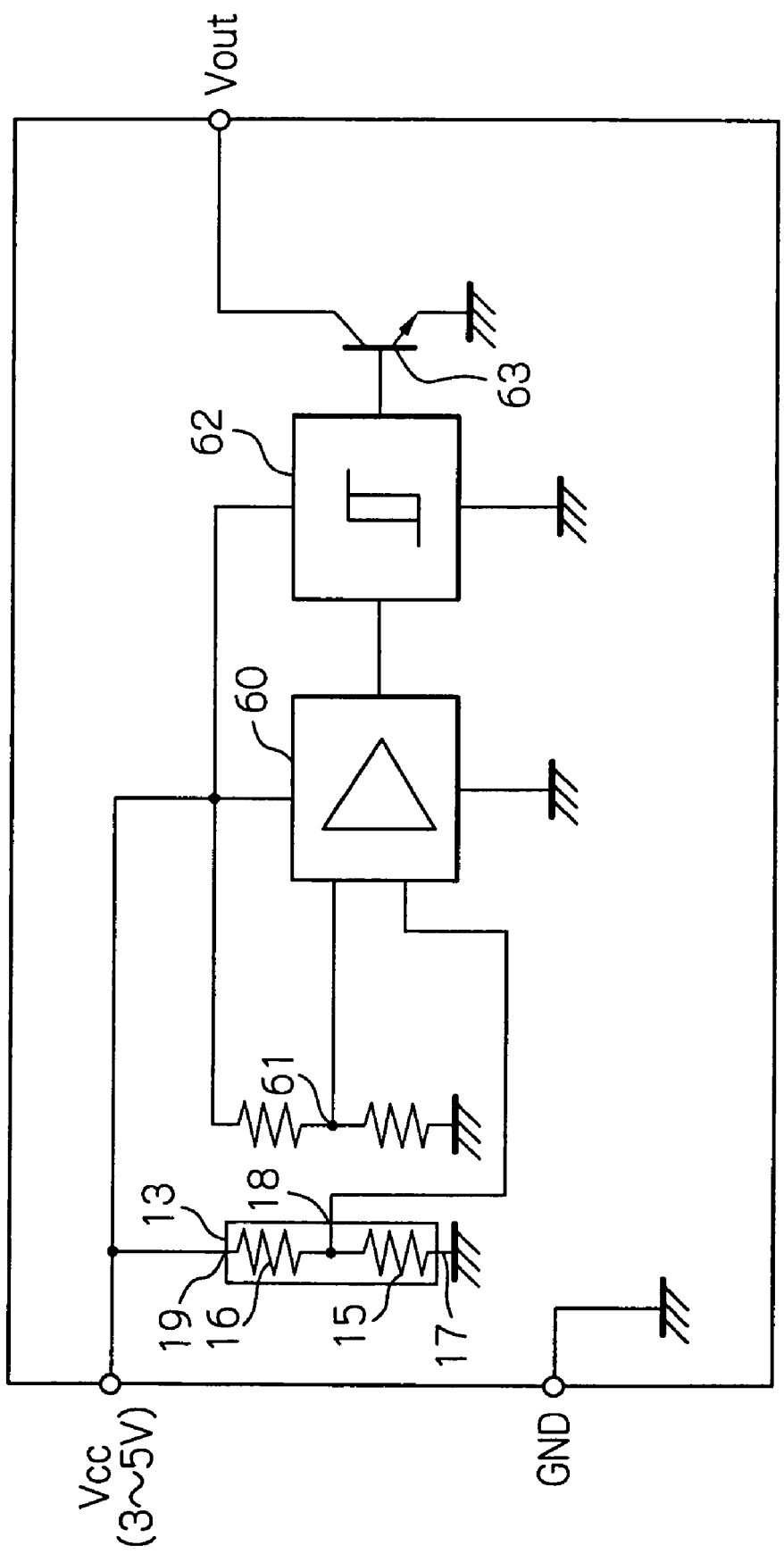
FIG. 6 shows a circuit diagram illustrating a circuit configuration of the angle switch device shown in FIG. 1.

FIG. 6 illustrates an example of the circuit configuration of the angle switch device in this embodiment.

As shown in the figure, the two GMR elements 15 and 16 of the magnetic detection element 13 are connected in series between the power supply Vcc and the ground GND and its middle point that is a terminal 18 is connected to one input terminal of a differential amplifier circuit 60. The other input terminal of the differential amplifier circuit 60 is connected to a middle potential supply point 61. An output terminal of the differential amplifier circuit 60 is connected to an input terminal of a Schmitt trigger circuit 62 and an output terminal of the Schmitt trigger circuit 62 is connected to an open-corrector type output transistor circuit 63.

The differential amplifier circuit 60 provides a differential output between a half bridge output of the two GMR elements and a threshold of Vcc-GND middle voltage. This differential output is applied to the output transistor circuit 63 via the Schmitt trigger circuit 62 to on/off-control this transistor. Therefore, the angle switch device provides a binary signal Vout indicating whether the angle $\theta$ of the magnetic field applied to the GMR elements 15 and 16 from the magnet section 14 is larger than or smaller than 90 degrees. It should be noted that the circuit configuration shown in FIG. 6 is merely as an example and various circuit configurations other than this example may be adopted. For example, instead of the differential amplifier, a comparator circuit may be used.

In this embodiment, by using the GMR elements, a binary signal is provided depending upon that a direction of the magnetic field applied to the GMR elements from the magnet section 14 is inclined to which side with respect to the fixed magnetization direction of these GMR elements. Because used are the GMR elements capable of providing outputs that steeply change around the threshold angle and also these outputs around the threshold angle are utilized for the switching operations, highly sensitive and precise detection can be performed even if the applied magnetic field is extremely weak. Therefore, it is possible to use a small size magnet with a low residual magnetic flux density and thus the whole size of the sensor can be greatly decreased. Furthermore, because the GMR element is used instead of the Hall element, stable detection can be expected even when the environment temperature changes.

Particularly, in this embodiment, because the outputs from the two GMR elements 15 and 16 arranged in parallel with each other and magnetized to have fixed magnetization directions opposite to each other are derived by using half bridge connection, change in the outputs of the GMR elements dependent on the environment temperature can be effectively compensated resulting to provide more stable angle detection under variations in the environment temperature.

In the aforementioned embodiment, the angle switch device is utilized for detecting folding and unfolding operations of the mobile phone. However, the angle switch device according to the present invention can be used for detecting inside out state of the cover case of the mobile phone due to its horizontal rotation in the direction perpendicular to the rotation direction of the hinge section for example, for detecting open/close state or inside out state of a display section of a video camera, or for various other applications. In case that a plurality of magnetic detection elements, a plurality of magnet sections or a plurality of angle switch devices are mounted around the same axis, switching operations at a plurality of angles can be realized.

Many widely different embodiments of the present invention may be constructed without departing from the spirit and scope of the present invention. It should be understood that the present invention is not limited to the specific embodiments described in the specification, except as defined in the appended claims.

The invention claimed is:

1. An angle switch device comprising:
   at least one magnetoresistive effect element with a pinned layer and a free layer; and
   a magnet section,
   wherein a relative angle in a perpendicular plane, between said magnet section and a lamination plane of said at least one magnetoresistive effect element is variable, said perpendicular plane containing a fixed magnetization direction of said at least one magnetoresistive effect element and being perpendicular to said lamination plane of said at least one magnetoresistive effect element, and
   said device provides a signal caused by a change in a resistance of said at least one magnetoresistive effect element around 90 degrees of the relative angle between said magnet section and said lamination plane of said at least one magnetoresistive effect element, said signal representing whether said relative angle is larger than or smaller than 90 degrees.

2. The angle switch device as claimed in claim 1, wherein said device further comprises a circuit connected to an output terminal of said at least one magnetoresistive effect element, for comparing an output from said at least one magnetoresistive effect element with a predetermined threshold to provide a binary signal that represents whether the relative angle between said magnet section and said lamination plane of said at least one magnetoresistive effect element is larger than or smaller than 90 degrees.

3. The angle switch device as claimed in claim 2, wherein said circuit comprises a comparator circuit or a differential amplifier circuit for comparing the output from said at least one magnetoresistive effect element with the predetermined threshold, and an output circuit for providing the binary signal depending upon an output from said comparator circuit or said differential amplifier circuit.

4. The angle switch device as claimed in claim 1, wherein said at least one magnetoresistive effect element consists of a single magnetoresistive effect element.

5. The angle switch device as claimed in claim 1, wherein said at least one magnetoresistive effect element consists of two magnetoresistive effect elements arranged in parallel with each other, fixed magnetization directions of said two magnetoresistive effect elements being opposite to each other.

6. The angle switch device as claimed in claim 5, wherein output terminals of said two magnetoresistive effect elements are connected in series with each other, an output being derived from a middle point of the series connection.

7. The angle switch device as claimed in claim 1, wherein said at least one magnetoresistive effect element is arranged at a fixed position and said magnet section is arranged at a rotatable position capable of rotating around said fixed position.

8. The angle switch device as claimed in claim 1, wherein said at least one magnetoresistive effect element comprises at least one giant magnetoresistive effect element or at least one tunnel magnetoresistive effect element.

* * * * *